(12) United States Patent
Kanada et al.

(10) Patent No.: US 8,605,731 B2
(45) Date of Patent: Dec. 10, 2013

(54) NETWORK SYSTEM AND SERVER

(75) Inventors: Yasusi Kanada, Tokyo (JP); Hiroshi Kodaka, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 1161 days.

(21) Appl. No.: 11/760,947

(22) Filed: Jun. 11, 2007

(65) Prior Publication Data
US 2007/0286208 A1     Dec. 13, 2007

(30) Foreign Application Priority Data

Jun. 12, 2006   (JP) ................................ 2006-161786

(51) Int. Cl.
*H04L 12/28*     (2006.01)
*H04Q 11/04*     (2006.01)

(52) U.S. Cl.
CPC ................................ *H04Q 11/0478* (2013.01)
USPC ...... 370/395.53; 370/338; 370/351; 370/352; 370/356; 370/389; 370/401; 370/465; 370/486; 709/217; 709/223; 455/404.2; 455/456.1

(58) Field of Classification Search
None
See application file for complete search history.

(56) References Cited

U.S. PATENT DOCUMENTS

| | | | |
|---|---|---|---|
| 6,205,122 B1 * | 3/2001 | Sharon et al. | 370/254 |
| 6,873,602 B1 * | 3/2005 | Ambe | 370/254 |
| 7,103,034 B1 * | 9/2006 | Srinivas et al. | 370/352 |
| 7,167,470 B2 * | 1/2007 | Bailey et al. | 370/352 |
| 7,898,977 B2 * | 3/2011 | Roese et al. | 370/254 |
| 2004/0249776 A1 * | 12/2004 | Horvitz et al. | 706/21 |
| 2006/0114839 A1 * | 6/2006 | Meier et al. | 370/254 |

FOREIGN PATENT DOCUMENTS

| | | |
|---|---|---|
| JP | 2003-032257 | 1/2003 |
| JP | 2005-110314 | 4/2005 |
| JP | 2005-292906 | 10/2005 |

OTHER PUBLICATIONS

"Integrated Wireless LAN Access System—Study on Location System" by A. Ogino, et al, p. 662, General Conference 2003, Institute of Electronics, Information and Communication Engineers.
K. Tsunehara, et al, "Integrated Wireless LAN Access System (2)—Study on Position Location Accuracy" General Conference 2003, Institute of Electronics, Information and Communication Engineers.

* cited by examiner

*Primary Examiner* — Faruk Hamza
*Assistant Examiner* — Aixa A Guadalupe-Cruz
(74) *Attorney, Agent, or Firm* — Mattingly & Malur, PC

(57) ABSTRACT

One or more LAN switches capable of accessing the contents of a MAC address table, which the LAN switch contains, from the outside; and a presence server storing in a storage device a first correspondence table between a MAC address of a network interface, which equipment contains, and its user, and a second correspondence table between a port of the above-described LAN switch, and a physical range wired therefrom, are used to thereby obtain a correspondence table between the equipment, its user, and its physical location (range), whereby making applicable also to a wired LAN at the time of determining the location of the equipment or the location of a user using the equipment in a building, and making realizable at low cost, and allowing the location to be determined accurately within a predetermined segmented area, and not being affected even if an IP address is changed.

5 Claims, 10 Drawing Sheets

OVERVIEW OF A LOCATION INFORMATION ACQUISITION PROCEDURE

CONFIGURATION OF ROOMS, A NETWORK, AND EQUIPMENT IN A BUILDING

| LAN SWITCH NAME | PORT NUMBER | PLACE NAME | |
|---|---|---|---|
| OFFICE | 1 | OFFICE DESK 1 | ~202 |
| OFFICE | 2 | OFFICE DESK 2 | ~203 |
| OFFICE | 3 | OFFICE DESK 3 | ~204 |
| MEETING ROOM | 1 | MEETING ROOM FRONT | ~205 |
| MEETING ROOM | 2 | MEETING ROOM REAR | ~206 |

PORT - PLACE CORRESPONDENCE TABLE OF A PRESENCE SERVER

FIG.3

| MAC ADDRESS | USER ID |
|---|---|
| 99-20-ED-7A-3E-CF | YAMADA |
| 87-80-C8-6B-61-9F | TAKAI |
| 44-50-89-FE-75-43 | KUNISAKI |

301
302
303
304

MAC ADDRESS - USER ID CORRESPONDENCE TABLE OF A PRESENCE SERVER

FIG.4

| PORT NUMBER | MAC ADDRESS |
|---|---|
| 1 | 99-20-ED-7A-3E-CF |
| 3 | 87-80-C8-6B-61-9F |
| 4 | 44-50-89-FE-75-43 |
| 4 | 88-91-92-93-94-95 |

401
402
403
404
405

MAC ADDRESS TABLE OF LAN SWITCH 123

FIG.5

| PORT NUMBER | MAC ADDRESS |
|---|---|
| 1 | 44-50-89-FE-75-43 |
| 3 | 87-80-C8-6B-61-9F |
| 3 | 99-20-ED-7A-3E-CF |
| 4 | 88-91-92-93-94-95 |

501
502
503
504
505

MAC ADDRESS TABLE OF LAN SWITCH 124

FIG.6

| LAN SWITCH NAME | PORT NUMBER | MAC ADDRESS |
|---|---|---|
| OFFICE | 1 | 99-20-ED-7A-3E-CF |
| OFFICE | 2 | 87-80-C8-6B-61-9F |
| MEETING ROOM | 1 | 44-50-89-FE-75-43 |

601
602
603
604

PORT - MAC ADDRESS CORRESPONDENCE TABLE OF A PRESENCE SERVER

LOCATION INFORMATION ACQUISITION PROCEDURE OF A PRESENCE SERVER

| PLACE NAME | INDIVIDUAL ID | |
|---|---|---|
| OFFICE DESK 1 | YAMADA | 802 |
| OFFICE DESK 3 | TAKAI | 803 |
| MEETING ROOM FRONT | KUNISAKI | 804 |

801

PRESENCE TABLE OF A PRESENCE SERVER / PRESENCE DISPLAY OF PC

PRESENCE DISPLAY OF PC

METHOD OF OBTAINING LOCATION INFORMATION USING APPLICATION COMMUNICATION
(FIFTH EMBODIMENT)

FIG.12

| VLAN ID | PLACE NAME |
|---|---|
| 1 | OFFICE DESK 1 |
| 2 | OFFICE DESK 2 |
| 3 | OFFICE DESK 3 |
| 4 | MEETING ROOM FRONT |
| 5 | MEETING ROOM REAR |

VLAN ID - PLACE CORRESPONDENCE TABLE OF A PRESENCE SERVER IN A SECOND EMBODIMENT

FIG.13

| VLAN ID | PORT NUMBER | MAC ADDRESS |
|---|---|---|
| 1 | 1 | 99-20-ED-7A-3E-CF |
| 3 | 2 | 87-80-C8-6B-61-9F |
| 4 | 4 | 44-50-89-FE-75-43 |
| 6 | 4 | 88-91-92-93-94-95 |

MAC ADDRESS TABLE OF LAN SWITCH 123 IN THE SECOND EMBODIMENT

FIG.14

| VLAN ID | PORT NUMBER | MAC ADDRESS |
|---|---|---|
| 4 | 1 | 44-50-89-FE-75-43 |
| 3 | 3 | 87-80-C8-6B-61-9F |
| 1 | 3 | 99-20-ED-7A-3E-CF |
| 6 | 4 | 88-91-92-93-94-95 |

MAC ADDRESS TABLE OF LAN SWITCH 124 IN THE SECOND EMBODIMENT

| VLAN ID | MAC ADDRESS |
|---|---|
| 1 | 99-20-ED-7A-3E-CF |
| 3 | 87-80-C8-6B-61-9F |
| 4 | 44-50-89-FE-75-43 |

VLAN ID - MAC ADDRESS CORRESPONDENCE TABLE OF A PRESENCE SERVER IN THE SECOND EMBODIMENT

OVERVIEW OF A LOCATION INFORMATION ACQUISITION PROCEDURE

SNMP TRAP RECEIVE PROCESS IN A PRESENCE SERVER IN A THIRD EMBODIMENT

FIG.18

| LAN SWITCH NAME | PORT NUMBER | PLACE NAME | TELEPHONE NUMBER |
|---|---|---|---|
| OFFICE | 1 | OFFICE DESK 1 | 4001 |
| OFFICE | 2 | OFFICE DESK 2 | 4002 |
| OFFICE | 3 | OFFICE DESK 3 | 4003 |
| MEETING ROOM | 1 | MEETING ROOM FRONT | 5001 |
| MEETING ROOM | 2 | MEETING ROOM REAR | 5002 |

PORT - PLACE CORRESPONDENCE TABLE OF A PRESENCE SERVER
IN A SEVENTH EMBODIMENT

FIG.19

| PLACE NAME | TELEPHONE NUMBER | INDIVIDUAL ID |
|---|---|---|
| OFFICE DESK 1 | 4001 | YAMADA |
| OFFICE DESK 3 | 4003 | TAKAI |
| MEETING ROOM FRONT | 5001 | KUNISAKI |

PRESENCE TABLE OF THE PRESENCE SERVER / PRESENCE DISPLAY OF PC
IN THE SEVENTH EMBODIMENT

FIG.20

| MAC ADDRESS | EQUIPMENT ASSET MANAGEMENT NUMBER | MODEL NAME | USER ID |
|---|---|---|---|
| 99-20-ED-7A-3E-CF | PC10001 | Emperor101 | YAMADA |
| 87-80-C8-6B-61-9F | PC10003 | Floral5530 | TAKAI |
| 44-50-89-FE-75-43 | PC10102 | ThoughtPat | KUNISAKI |

MAC ADDRESS - EQUIPMENT INFORMATION CORRESPONDENCE TABLE OF AN EQUIPMENT MANAGEMENT SERVER

FIG.21

| PLACE NAME | EQUIPMENT ASSET MANAGEMENT NUMBER | MODEL NAME | INDIVIDUAL ID |
|---|---|---|---|
| OFFICE DESK 1 | PC10001 | Emperor101 | YAMADA |
| OFFICE DESK 3 | PC10003 | Floral5530 | TAKAI |
| MEETING ROOM FRONT | PC10102 | ThoughtPat | KUNISAKI |

EQUIPMENT LOCATION TABLE OF THE EQUIPMENT MANAGEMENT SERVER

NETWORK SYSTEM AND SERVER

INCORPORATION BY REFERENCE

The present application claims priority from Japanese application JP2006-161786 filed on Jun. 12, 2006, the content of which is hereby incorporated by reference into this application.

BACKGROUND OF THE INVENTION

1. Field of the Invention

The present invention relates to methods for obtaining a location of equipment connected to a network in a building or the like, methods for displaying a list of the equipment, and methods for managing the equipment.

2. Description of the Related Art

Although the methods for obtaining a location of equipment outside a building include the one using GPS, the one using a magnetic sensor, and the like, these methods do not indicate an accurate location in a building. The conventional techniques concerning the methods for obtaining a location in a building include Integrated Wireless LAN Access System (1): Study on Location System, by Ogino, Tsunehara, et al., B-5-203, Proceedings of Institute of Electronics, Information and Communication Engineers General Conference, Vol. 2003_Communication NO. 1, pp. 662 (2003. 03), Integrated Wireless LAN Access System (2): Study on Position Location Accuracy, by Tsunehara, Ogino, et al., B-5-204, Proceedings of Institute of Electronics, Information and Communication Engineers General Conference, Vol. 2003_Communication NO. 1, pp. 663 (2003. 03), and JP-A-2005-110314, as the method for obtaining a location using a wireless LAN equipment. These methods measure the location of a wireless LAN equipment using a plurality of wireless LAN access points.

Moreover, the conventional techniques concerning determining and retrieving an installation place of a LAN component unit include JP-A-2005-110314 as a method for determining an installation place of a LAN component unit by allowing a correspondence between MAC addresses and port numbers of LAN component units to be accessed as extended MIB information of the LAN component units.

Moreover, the conventional techniques concerning an asset management of equipment connected to a LAN include JP-A-2005-292906 as a method for obtaining and managing not only a logical location but also a physical location on a network by storing the physical location of the equipment into a database for each logical identifier in advance, with the IP address of the equipment being as the logical identifier.

SUMMARY OF THE INVENTION

The conventional technique concerning the method for obtaining a location in a building described in JP-A-2005-110314 has firstly a problem that it can be applied only to equipment using a wireless LAN. Secondly, only one wireless LAN access point is required when not carrying out the location measurement, while a plurality of wireless LAN access points and the equipment for the measurement are required in order to apply this method, thus presenting a problem of high cost. Thirdly, it has a problem that the determination of a location with high accuracy is difficult in the state of the art today.

Moreover, the conventional technique concerning determining and retrieving the installation place of a LAN component unit described in JP-A-2003-32257 has firstly a problem that although which port of other LAN component unit a LAN component unit is connected to can be identified, the physical location thereof cannot be determined. Secondly, it has a problem that although the port of a LAN component unit equipped with an extended MIB can be identified, the location of a LAN component unit not equipped with the extended MIB and the location of a general equipment connected to the LAN component unit cannot be determined.

Moreover, the conventional technique concerning the asset management of equipment connected to a LAN described in JP-A-2005-292906 has a problem that an incorrect information is registered in the system if an IP address is changed in order to use the IP address as a logical identifier. In particular, in the environment where a dynamic allocation of the IP address by DHCP (Dynamic Host Configuration Protocol) is carried out, the DHCP being widely used to eliminate an inconvenience in the fixed IP address allocation, the method described in JP-A-2005-292906 cannot be used.

The present invention is intended to provide a method that is applicable also to a wired LAN at the time of determining a location of equipment or a location of a user using the equipment and obtaining the location information of a plurality of equipment and users, the method being realizable at low cost, the method being applicable also to equipment not having a special function, the method allowing a location to be determined accurately within a predetermined segmented area, the method not being affected even if an IP address is changed. In order to solve the above-described problems, in the present invention, firstly, one or more LAN switches capable of accessing the contents of a MAC address table, which the LAN switch contains, from the outside are used. Secondly, a presence server (computer) for storing in a storage device a first correspondence table between a MAC address of a network interface contained in equipment and its user, and a second correspondence table between a port of the LAN switch and a physical range wired therefrom, is used.

The above-described presence server accesses the contents of the above-described MAC address table from each LAN switch and obtains a third correspondence table between each port of the LAN switch and the MAC address of the equipment connected thereto. By combining the third correspondence table with the first and second correspondence tables, a correspondence table between the equipment or its user and its physical location (range) can be obtained.

Accordingly, also in a wired LAN, the location of equipment or the location of a user can be determined, and because other than an essentially required LAN switch, only one PC is used, the location can be determined at low cost, and by limiting the wiring range from the LAN switch, the range of a location can be determined accurately. Moreover, the method of the present invention will not be affected by an IP address change because the MAC address is used in order to identify equipment. Accordingly, all the above-described problems can be solved.

Other objects, features and advantages of the invention will become apparent from the following description of the embodiments of the invention taken in conjunction with the accompanying drawings.

BRIEF DESCRIPTION OF THE DRAWINGS

FIG. 3 is a view showing a MAC address-user ID correspondence table of the presence server in the first embodiment.

FIG. 4 is a view showing the contents of a MAC address table of a LAN switch 123 in the first embodiment.

FIG. 5 is a view showing the contents of a MAC address table of a LAN switch 124 in the first embodiment.

FIG. 6 is a view showing the contents of a port-MAC address correspondence table of the presence server in the first embodiment.

FIG. 12 is a view showing the contents of a VLAN ID-place correspondence table of a presence server in a second embodiment.

FIG. 13 is a view showing the contents of a MAC address table of a LAN switch 123 in the second embodiment.

FIG. 14 is a view showing the contents of a MAC address table of a LAN switch 124 in the second embodiment.

FIG. 18 is a view showing a port-place correspondence table of a presence server in a seventh embodiment.

FIG. 19 is a view showing the contents of a presence table of a presence server/contents of presence display of PCs in the seventh embodiment.

FIG. 20 is a MAC address-equipment information correspondence table of an equipment management server.

FIG. 21 is an equipment location table of the equipment management server.

DETAILED DESCRIPTION OF THE EMBODIMENT

[Embodiment 1]

Figures 1, 2:
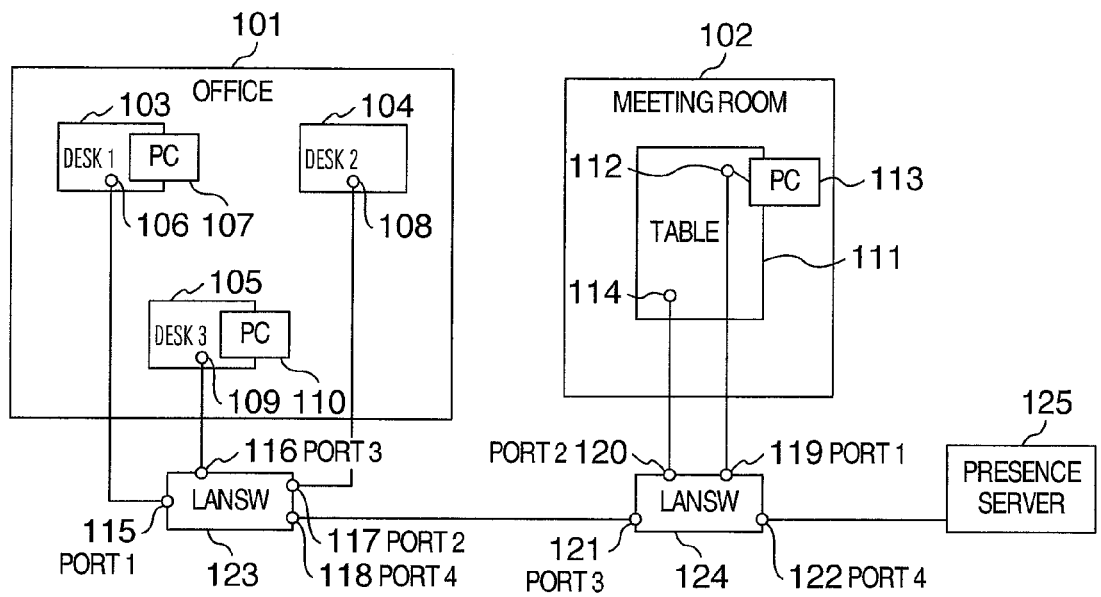
FIG. 1 is a configuration diagram of rooms, a network, and equipment in a building in a first embodiment.
FIG. 2 is a view showing a port-place correspondence table of a presence server in the first embodiment.

A first embodiment of the present invention is described. In this embodiment, only wired LAN equipment via Ethernet (registered trademark) (IEEE 802.2) is used. The configuration of rooms, a network, and equipment in a building according to this embodiment is described using FIG. 1. In this embodiment, an office 101 and a meeting room 102 exist in a building. However, the office 101 and the meeting room 102 may exist in different buildings. Moreover, the Ethernet connecting between the office 101 and the meeting room 102 may be a wide area network.

The office 101 is a free address (hotelling) office, and a worker is assigned a desk when he/she comes to the office every day. In the office 101, a desk 1 103, a desk 2 104, and a desk 3 105 exist, and other than these a lot of desks also exist. A LAN switch 123 is used in a LAN wired to the office 101, and a LAN switch 124 is used in a LAN wired to the meeting room 102. The LAN switches 123 and 124 have the function to access the contents of a MAC address table, which these switches store therein, from the outside. Some of the commercially available LAN switches display the contents thereof via a telnet command such as "show mac-address-table" or via the Web (HTTP).

At the desk 1 103, a first worker has connected PC 107 to a LAN at a connecting point 106. PC 107 has a network interface of a MAC address 99-20-ED-7A-3E-CF. From the connecting point 106, a LAN cable is wired to a port 1 115 of the LAN switch 123 in advance. Moreover, in the desk 3 105, a second worker has connected PC 110 to the LAN at a connecting point 109. PC 110 has a network interface of a MAC address 87-80-C8-6B-61-9F. From the connecting point 109, a LAN cable is wired to a port 3 116 of the LAN switch 123 in advance.

In the meeting room 102, there are connecting points 112, 114 to the LAN, and a third worker has connected PC 113 to the LAN at the connecting point 112. PC 113 has a network interface of a MAC address 44-50-89-FE-75-43. From the connecting point 112, a LAN cable is wired to a port 1 119 of the LAN switch 124 in advance. Moreover, a port 4 118 of the LAN switch 123 and a port 3 121 of the LAN switch 124 are connected to each other, and a presence server 125 is connected to a port 4 122 of the LAN switch 124. The presence server 125 has a network interface of a MAC address 88-91-92-93-94-95.

FIG. 2 describes a port-place correspondence table 201 that is stored in the presence server 125 in advance. The port-place correspondence table 201 is a table for describing a correspondence between a LAN switch name, a port number in this LAN switch, and the location (wiring range from a connecting point) of the connecting point connected to this port. In other words, a row 202 describes that the port 1 115 of the LAN switch 123, the port 1 115 being named "Office", corresponds to a place of the desk 1 103 of the office 101. A row 203 describes that the port 2 117 of the LAN switch 123 corresponds to a place of the desk 2 104 of the office 101. A row 204 describes that the port 3 116 of the LAN switch 123 corresponds to a place of the desk 3 105 of the office 101. A row 205 describes that the port 1 119 of the LAN switch 124 named "Meeting room" corresponds to a front of the meeting room 102. A row 206 describes that the port 2 120 of the LAN switch 124 corresponds to a rear of the meeting room 102. Although here, a kanji name is used as an identifier of the LAN switch, an alphabetic-character name, a number, and the like may be used.

Although in FIG. 2 the correspondence between the port number in the LAN switch and the location information of a connecting point connected to this port is expressed in the form of a table, other form expressing this correspondence, for example, a function that returns the location information upon input of a port number may be used.

FIG. 3 describes a MAC address-user ID correspondence table 301 that is stored in the presence server 125 in advance. The MAC address-user ID correspondence table 301 is a correspondence table between a MAC address of a network interface, which the equipment to be located contains, and a user using this equipment. Here, assume that each equipment is used by one specific user. A row 302 describes that a user called Yamada is using the equipment (i.e., PC 107) having a network interface whose MAC address is 99-20-ED-7A-3E-CF. A row 303 describes that a user called Takai is using the equipment (i.e., PC 110) having a network interface whose MAC address is 87-80-C8-6B-61-9F. A row 304 describes that a user called Kunisaki is using the equipment (i.e., PC 113) having a network interface whose MAC address is 44-50-89-FE-75-43.

Although in FIG. 3 the correspondence between a MAC address of a network interface and a user using the network interface is expressed in the form of a table, other form expressing this correspondence, for example, a function that returns a user identifier upon input of a MAC address may be used.

In addition, although an alphabet name is used as a user identifier in FIG. 3, an employee number or other symbol string may be used. Moreover, although only one MAC address is registered for each user in FIG. 3, a plurality of equipment may be registered for one user. If one user uses a plurality of equipment at different places, it appears that one person exists at a plurality of places at the same time, which is unreasonable, however, this problem can be solved by identifying the latest MAC address information among the MAC address information from these plurality of equipment, and regarding the equipment that sent the latest one, as the most probable one as the candidate of the user location, and then by displaying this distinctly from other equipment which the same user uses. In order to identify the latest MAC address information, the time when the information was obtained may be attached to each row in a port-MAC address correspondence table 601 described below and then the above-described time may be copied also to a presence table 801 described below so as to be used when displaying.

Moreover, although in FIG. 3 a user identifier is given only to a specific user, a user identifier for an unnamed user such as a guest or the like can be also used. Accordingly, even when an unregistered user or a user other than the member of an organization uses equipment, this can be reflected on the location information.

FIG. 4 describes a MAC address table 401 which the LAN switch 123 contains. Although the contents of the MAC address table are empty before being connected to the network, if the LAN switches are connected to each other, and PC 107, PC 110, PC 113, and the presence server 125 are connected and the packets from these arrived, then the MAC addresses thereof are registered in the MAC address table, so that the contents of the MAC address table 401 become as described in FIG. 4.

In the MAC address table 401, a row 402 describes that the port 1 115 is connected to a network interface having the MAC address 99-20-ED-7A-3E-CF (i.e., PC 107 is connected). A row 403 describes that the port 3 116 is connected to a network interface having the MAC address 87-80-C8-6B-61-9F (i.e., PC 110 is connected). A row 404 describes that the port 4 118 is connected to a network interface having the MAC address 44-50-89-FE-75-43 (i.e., PC 113 is connected). A row 405 describes that the port 4 118 together with the one described in the row 404 are connected to a network interface having a MAC address 88-91-92-93-94-95 (i.e., the presence server 125 is connected).

Upon arrival of an Ethernet (registered trademark) packet, the LAN switch typically retrieves with reference to the MAC address table a destination MAC address, which the Ethernet packet contains, in the MAC address table, and determines a corresponding port and sends this Ethernet packet from this port. For example, if an Ethernet packet whose destination address is 99-20-ED-7A-3E-CF arrived at the LAN switch 123, then this packet is sent to the port 1 115, which is determined from the row 402 of the MAC address table 401, and will arrive at PC 1 107 having the MAC address 99-20-ED-7A-3E-CF.

FIG. 5 describes a MAC address table 501 which the LAN switch 124 contains. Although the contents of the MAC address table are empty before being connected to the network, if the LAN switches are connected to each other, and PC 107, PC 110, PC 113, and the presence server 125 are connected and the packets from these arrived, then the MAC addresses thereof are registered in this MAC address table, so that the contents of the MAC address table 501 become as described in FIG. 5.

In the MAC address table 501, a row 502 describes that the port 1 119 is connected to a network interface having the MAC address 44-50-89-FE-75-43 (i.e., PC 113 is connected). A row 503 describes that the port 3 121 is connected to a network interface having the MAC address 87-80-C8-6B-61-9F (i.e., PC 110 is connected). A row 504 describes that the port 3 121 is connected to a network interface having the MAC address 99-20-ED-7A-3E-CF (i.e., PC 107 is connected). A row 505 describes that the port 4 122 is connected to a network interface having the MAC address 88-91-92-93-94-95 (i.e., the presence server 125 is connected).

Figures 15, 16:
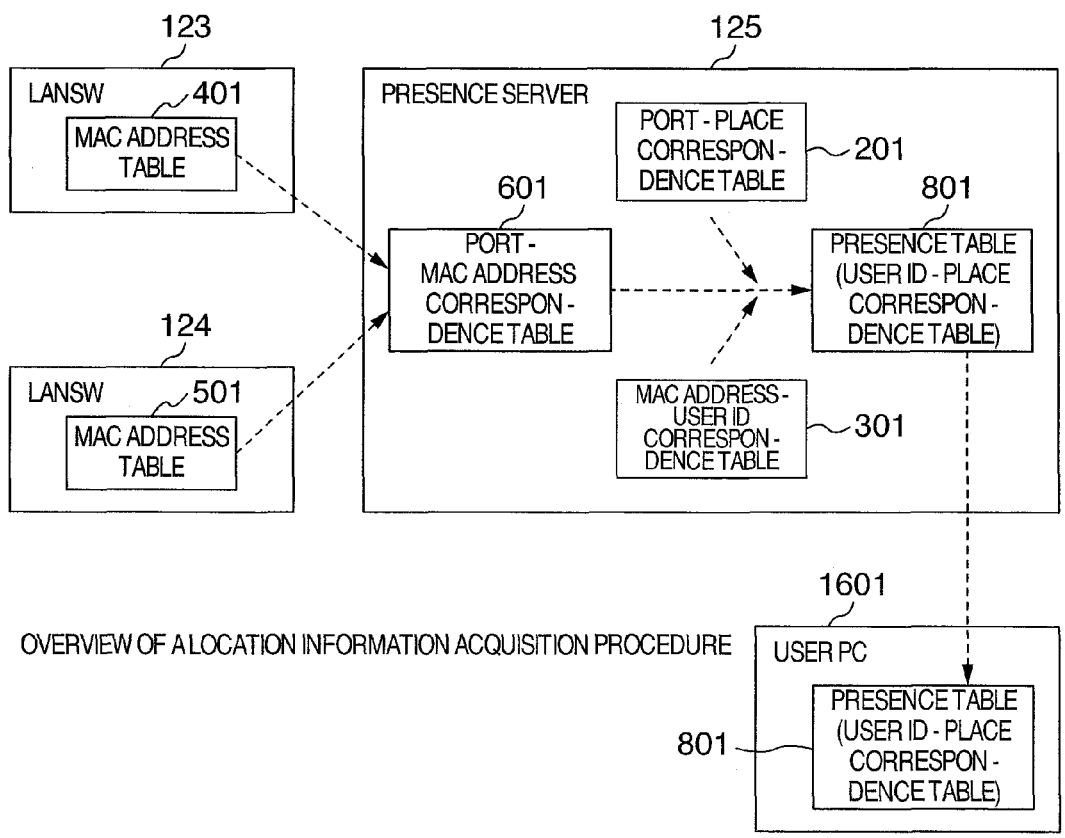
FIG. 15 is a view showing the contents of a VLAN ID-MAC address correspondence table of the presence server in the second embodiment.
FIG. 16 is a view showing an overview of a location information acquisition procedure in the first embodiment.

Hereinafter, a location information acquisition procedure and a procedure to distribute/display to a user PC in the presence server 125 will be described. FIG. 16 describes an overview of the procedures. Namely, the LAN switch 123 contains the MAC address table 401 and the LAN switch 124 contains the MAC address table 501, while the presence server 125 collects these contents to generate the port-MAC address correspondence table 601. The presence server 125 further generates the presence table 801 using the port-MAC address correspondence table 601, the port-place correspondence table 201, and the MAC address-user ID correspondence table 301. The presence table 801 is distributed to each user PC 1601 for displaying.

Figure 7:
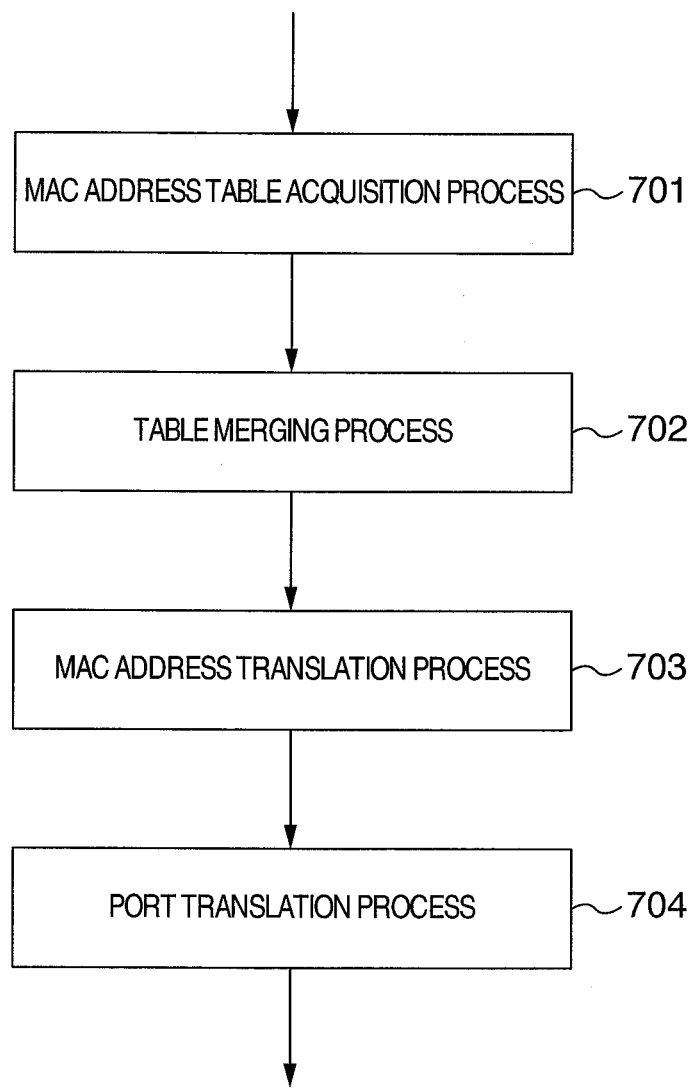
FIG. 7 is a view showing a location information acquisition procedure of the presence server in the first embodiment.

FIG. 7 describes the location information acquisition procedure in the presence server 125. The presence server 125 carries out the procedure of FIG. 7 periodically, for example, every one minute. In other words, first, in a MAC address table acquisition process 701, the contents of the MAC address table are obtained from each LAN switch and only information on a port that is associated with a place is stored in a main storage. In other words, from the LAN switch 123, the port-MAC address correspondence table 401 is obtained and only the ones related to the port 1 115, the port 2 117, and the port 3 116, which are associated with the places in the port-place correspondence table 201, are stored. In other words, because the row 404 and the row 405 are not related to the above-described ports, only the row 402 and the row 403 are stored. Accordingly, the information stored concerning the LAN switch 123 is as follows.

| Port number | MAC address |
|---|---|
| 1 | 99-20-ED-7A-3E-CF |
| 2 | 87-80-C8-6B-61-9F |

Moreover, from the LAN switch 124, the port-MAC address correspondence table 501 is obtained and only the ones related to the port 1 119 and the port 2 120, which are associated with the places in the port-place correspondence table 201, are stored. In other words, because the row 503, the row 504, and the row 505 are not related to the above-described ports, only the row 502 is stored. Accordingly, the information stored concerning the LAN switch 124 is as follows.

| Port number | MAC address |
| --- | --- |
| 1 | 44-50-89-FE-75-43 |

As described above, the function to take out the contents of the MAC address table from a LAN switch to the outside by a telnet command, is realized, for example, in LAN switch AX2400S of ALAXALA Networks Corporation and the like. The methods of taking out the contents of the MAC address table to the outside also include a method using HTTP as a protocol and using XML or HTML as a data representation language, other than the telnet command.

Next, in a table merging process 702, all of the contents of the port-MAC address correspondence tables stored in the main storage are summarized in one port-MAC address correspondence table 601 shown in FIG. 6. In this case, the LAN switch name is also added as an item of the correspondence table. Moreover, in a MAC address translation process 703, a MAC address in the port-MAC address correspondence table 601 is rewritten in a corresponding user identifier using the MAC address-user ID correspondence table 301. In other words, in the row 602, the MAC address 99-20-ED-7A-3E-CF is rewritten in "Yamada" that is the corresponding user identifier in the row 302. Moreover, in the row 603, the MAC address 87-80-C8-6B-61-9F is rewritten in "Takai" that is the corresponding user identifier in the row 303. Moreover, in the row 604, the MAC address 44-50-89-FE-75-43 is rewritten in "Kunisaki1" that is the corresponding user identifier in the row 304, thereby obtaining an intermediate correspondence table. However, if a target to be identified is not a user but equipment itself, there is no need to carry out the MAC address translation process 703. In this case, in a next port translation process 704, the port-MAC address correspondence table 601 instead of the intermediate correspondence table may be used.

Figures 8, 9:
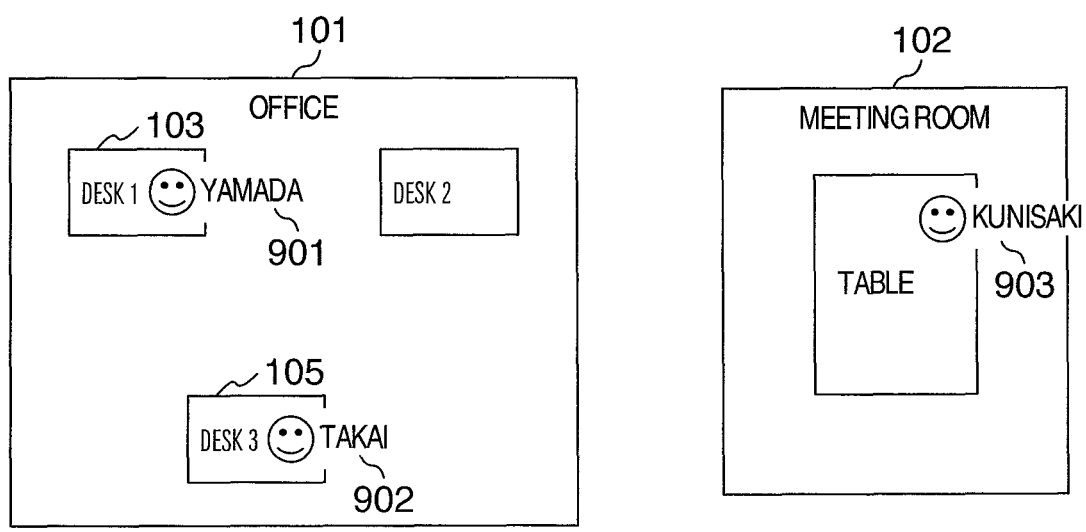
FIG. 8 is a view showing the contents of a presence table of the presence server/contents of presence display of PCs in the first embodiment.
FIG. 9 is a view showing the contents of presence display of PCs in the first embodiment.

Finally, in the port translation process 704, the LAN switch name and the port number in the intermediate correspondence table are rewritten in a place name using the port-place correspondence table 201. As a result, the presence table 801 of FIG. 8 is obtained. In other words, if the LAN switch name is "Office" and the port number is 1 (data corresponding to the row 602), with reference to the row 202 a place name "Office Desk 1" is given. This gives a row 802. Moreover, if the LAN switch name is "Office" and the port number is 2 (data corresponding to the row 603), with reference to the row 204 a place name "Office Desk 3" is given. This gives a row 803. Moreover, if the LAN switch name is "Meeting room" and the port number is 1 (data corresponding to the row 604), with reference to the row 205 a place name "Meeting room Front" is given. This gives a row 804.

The contents of the presence table 801 are interpreted as follows. A row 802 describes that the equipment (PC 107) which a user called Yamada uses exists in a place called Office Desk 1 103. A row 803 describes that the equipment (PC 110) which a user called Takai uses exists in a place called Office Desk 3 105. A row 804 describes that the equipment (PC 113) which a user called Kunisaki uses exists in a place called Meeting room Front.

The contents of the presence table 801 are message sent when a request message arrived at the presence server 125 from a PC on the network or these are periodically message sent to a PC on the network from the presence server 125. Upon arrival of the message from the presence server 125, a PC on the network displays the contents in the form of the presence table 801 or in the form of illustrating the contents as shown in FIG. 9. FIG. 9 shows that a user 901 called Yamada has connected equipment to the desk 1 103 of the office 101, that a user 902 called Takai has connected equipment to the desk 3 105 of the office 101, and that a user 903 called Kunisaki has connected equipment to the front of the meeting room. In order to display as in FIG. 9, the shape of the office or meeting room, the size of the desk or table, the location of each place registered in the presence table 801 need to be contained in a message from the presence server 125. These information together with the port-place correspondence table 201 need to be registered in the presence server 125 in advance.

In addition, a method for managing equipment, which is realized by substituting an equipment management server for the presence server 125 in this embodiment and substituting an equipment management terminal for a terminal for displaying the presence, will be described using FIG. 20 and FIG. 21. Here, the equipment management terminal may exist at any location on the network. In other words, although the equipment management server has the function of the presence server 125, it uses a MAC address-equipment information correspondence table 2001 in place of the MAC address-user ID correspondence table 301. Because in the MAC address-equipment information correspondence table 2001, an equipment asset number in place of the user ID in the MAC address-user ID correspondence table 301 is described, it is possible to determine the location of equipment instead of determining a user location. Moreover, instead of generating the presence table 801, it is possible to display in the equipment management terminal an equipment location table 2101 showing a correspondence between equipment and a location where the equipment exists, or a map describing the location of equipment. These correspondence table and map can display a model name described in the MAC address-equipment information correspondence table 2001 together with a user identifier or a user name of the equipment described in a user ID column. If equipment management information is further added to the MAC address-equipment information correspondence table 2001, this can be also displayed together.

[Embodiment 2]

Next, a second embodiment of the present invention is described. In this embodiment, wired LAN equipment via VLAN (Virtual LAN) based on IEEE Standard IEEE 802.1Q is used. The configuration of rooms, a network, and equipment in a building in this embodiment is also as shown FIG. 1. Namely, also in this embodiment, the office 101 and the meeting room 102 exist in a building. A difference from the first embodiment is in that VLAN is used in the LAN switches 123 and 124. In other words, the LAN switches 123 and 124 have the function of VLAN and also have the function to access the contents of the MAC address table, which the LAN switch contains, from the outside. Since the VLAN switches 123 and 124 have the VLAN function, in the MAC address table not only the MAC address and the port number but VLAN ID are stored together, as in a typical VLAN switch.

A different VLAN ID is assigned to each port of the VLAN switch 123. Namely, as the VLAN ID, 1 is assigned for the port 1 115, 2 is assigned for the port 2 117, 3 for the port 3 116, and all of 1, 2, 3, 4, 5, and 6 are assigned for the port 4 118. However, in assigning a plurality of ports to the same place, the same VLAN ID is assigned to the plurality of ports. For example, when wiring from a port 5 of the VLAN switch 123 to the desk 1 103, 1 as the VLAN ID, the 1 being the same as the port 1 115, is given to the port 5.

Moreover, VLAN ID is also assigned to each port of the LAN switch 124 as follows. Namely, as the VLAN ID, 4 is assigned for the port 1 119, 5 is assigned for the port 2 120, 6 is assigned for the port 4 122, and all of 1, 2, 3, 4, 5, 6 are assigned for the port 3 121. This forms six logically independent LANs (VLANs) corresponding to from VLAN IDs 1 to 6 across the VLAN switch 123 and VLAN switch 124.

Because at this state the communication between each logically independent VLAN can not be carried out, provision is made so that packets may be exchanged between all the VLANs in the VLAN switch 124. In other words, a setting is made so that the VLAN switch 124 may operate as follows between all the ports. In the VLAN switch 124, a VLAN tag is attached to an Ethernet (registered trademark) packet that arrived at the port 1 119 and port 2 120 of the VLAN switch 124, wherein VLAN tag contains 4 as the VLAN ID in case of the port 1 119 and contains 5 as the VLAN ID in case of the port 2 120. However, when a destination MAC address contained in the Ethernet packet exists as an item on the MAC address table of the VLAN switch 124, the VLAN ID on the VLAN tag is replaced with a VLAN ID in the above-described item. With regard to a packet from PC 113 to PC 110, when the above packet arrived at the port 1 119 of the VLAN switch 124, 4 as the VLAN ID is assigned to the packet. However, because 3 as a destination VLAN ID is registered in the MAC address table of the VLAN switch 124, the VLAN ID is replaced with 3 and is transmitted to the VLAN switch 123. Because the VLAN switch 123 knows in the MAC address table that this is wired from the port 3 116, the packet is transmitted to PC 110 via the port 3 116.

The function to connect a plurality of VLANs and cause these to operate as if one VLAN as described above is realized, for example, in LAN switch AX2400S of ALAXALA Networks Corporation, and the like. In AX2400S, the setting is made using a setting command called "switchport vlan mapping".

FIG. 12 describes a VLAN ID-place correspondence table 1201 that is stored in the presence server 125 in advance. The VLAN ID-place correspondence table 1201 is a table for describing a correspondence between VLAN ID and the location of a connecting point connected to a port to which the VLAN ID is given. In other words, a row 1202 describes that a VLAN ID of 1 corresponds to a place of the desk 1 103 of the office 101. A row 1203 describes that a VLAN ID of 2 corresponds to a place of the desk 2 104 of the office 101. A row 1204 describes that a VLAN ID of 3 corresponds to a place of the desk 3 105 of the office 101. A row 1205 describes that a VLAN ID of 4 corresponds to the front of the meeting room 102. A row 1206 describes that a VLAN ID of 5 corresponds to the rear of the meeting room 102.

FIG. 13 describes a MAC address table 1301 which the VLAN switch 123 contains. Although the contents of the MAC address table are empty before being connected to the network, if the VLAN switches are connected to each other, and PC 107, PC 110, PC 113, and the presence server 125 are connected and the packets from these arrived, then the MAC addresses thereof are registered in the MAC address table, so that the contents become as those of the MAC address table 1301 described in FIG. 13.

In the MAC address table 1301, a row 1302 describes that at the destination of the port 1 115, a network interface having the MAC address 99-20-ED-7A-3E-CF, which is assigned 1 as the VLAN ID, is connected (i.e., PC 107 is connected). A row 1303 describes that at the destination of the port 3 116, a network interface having the MAC address 87-80-C8-6B-61-9F, which is assigned 3 as the VLAN ID, is connected (i.e., PC 110 is connected). A row 1304 describes that at the destination of the port 4 118, a network interface having the MAC address 44-50-89-FE-75-43, which is assigned 4 as the VLAN ID, is connected (i.e., PC 113 is connected). A row 1305 describes that at the destination of the port 4 118, a network interface having the MAC address 88-91-92-93-94-95, which is assigned 6 as the VLAN ID, is connected (i.e., the presence server 125 is connected).

FIG. 14 describes a MAC address table 1401 which the VLAN switch 124 contains. Although the contents of the MAC address table are empty before being connected to the network, if the LAN switches are connected to each other, and PC 107, PC 110, PC 113, and the presence server 125 are connected and the packets from these arrived, then the MAC addresses thereof are registered in the MAC address table, so that the contents become as those of the MAC address table 1401.

In the MAC address table 1401, a row 1402 describes that at the destination of the port 1 119, a network interface having the MAC address 44-50-89-FE-75-43, which is assigned 4 as the VLAN ID, is connected (i.e., PC 113 is connected). A row 1403 describes that at the destination of the port 3 121, a network interface having the MAC address 87-80-C8-6B-61-9F, which is assigned 3 as the VLAN ID, is connected (i.e., PC 110 is connected). A row 1404 describes that at the destination of the port 3 121, a network interface having the MAC address 99-20-ED-7A-3E-CF, which is assigned 1 as the VLAN ID, is connected (i.e., PC 107 is connected). A row 1405 describes that at the destination of the port 4 122, a network interface having the MAC address 88-91-92-93-94-95, which is assigned 6 as the VLAN ID, is connected (i.e., the presence server 125 is connected).

Then, a location information acquisition procedure in a second embodiment is described using FIG. 7. The presence server 125 carries out the procedure of FIG. 7 periodically, for example, every one minute. First, in a MAC address table acquisition process 701, the contents of a MAC address table are obtained from one LAN switch, to which all of the VLANs are assigned, and only the information concerning a VLAN ID, which is associated with a place, is stored in the main storage. As the LAN switch used here, either one of the LAN switch 123 and LAN switch 124 may be used. If the LAN switch 123 is used, the VLAN ID-MAC address correspondence table 1301 is obtained, and only the information concerning VLAN IDs 1, 3, and 4, which are associated with the places in the VLAN ID-place correspondence table 1201, are stored. In other words, because the row 1305 is not related to the above VLAN IDs, only the row 1302, row 1303, and row 1304 are stored. Accordingly, the information stored will be as shown in a VLAN ID-MAC address correspondence table 1501 of FIG. 15.

Next, in a MAC address translation process 703, a MAC address in the VLAN ID-MAC address correspondence table 1501 is rewritten in a corresponding user identifier using the MAC address-user ID correspondence table 301. In other words, in a row 1502, the MAC address 99-20-ED-7A-3E-CF is rewritten in "Yamada" that is the corresponding user identifier in the row 302. Moreover, in a row 1503, the MAC address 87-80-C8-6B-61-9F is rewritten in "Takai" that is the corresponding user identifier in the row 303. Moreover, in a row 1504, the MAC address 44-50-89-FE-75-43 is rewritten in "Kunisaki" that is the corresponding user identifier in the row 304, thereby obtaining an intermediate correspondence table. However, if a target to be identified is not a user but equipment itself, there is no need to carry out the MAC address translation process 703. In this case, in a next port translation process 704, the VLAN ID-MAC address correspondence table 1501 instead of the intermediate correspondence table may be used.

Finally, in the port translation process 704, the VLAN ID in the intermediate correspondence table is rewritten in a place name using the VLAN ID-place correspondence table 1201. As a result, the presence table 801 of FIG. 8 is obtained. In other words, for the VLAN ID of 1 (data corresponding to the row 1502), with reference to the row 1202 a place name "Office Desk 1" is given. This gives the row 802. Moreover, for the VLAN ID of 3 (data corresponding to the row 1503), with reference to the row 1204 a place name "Office Desk 3" is given. This gives the row 803. Moreover, for the VLAN ID of 4 (data corresponding to the row 1504), with reference to the row 1205 a place name "Meeting room Front" is given. This gives the row 804.

The method for distributing the presence table 801 from the presence server 125 to a PC on the network and the method for displaying this in a PC on the network in the second embodiment are the same as those of the first embodiment.

Although in the first embodiment all the LAN switches need to be polled periodically, in the second embodiment only one LAN switch just needs to be polled. Accordingly, there is an advantage that the load on the presence server 125 is reduced. Moreover, although in the first embodiment all of the target LAN switches need to have the function to take out the contents of the MAC address table to the outside, in the second embodiment only one LAN switch, which the presence server polls, just needs to have the function to take out the contents of the MAC address table to the outside, and all of the LAN switches just need to have only VLAN function. Because most of the middle or higher grade LAN switches have the VLAN function, in the second embodiment when introducing the present invention into an existing LAN, the existing LAN switch does not need to be replaced, thus providing an advantage that the investment cost to the LAN switch can be reduced.

The basic embodiments have been described above. Hereinafter, embodiments that modified part of the above-described embodiments will be described.

[Embodiment 3]

First, a third embodiment is described. In this embodiment, the presence information is pushed from a LAN switch to the presence server 125. In the embodiment, only the procedure of obtaining the contents of the MAC address table from a LAN switch and merging the above contents in the first embodiment differs. A location information acquisition procedure in this embodiment is described. In this embodiment, a setting of SNMP (Simple Network Management Protocol) linkup trap and linkdown trap to the presence server 125 is established in the LAN switch 123 and LAN switch 124. In other words, the setting is made so that the LAN switch 123 and LAN switch 124 transmit an SNMP trap packet to the presence server 125 when a link between the LAN switch 123, the LAN switch 124 and a network interface of other equipment is established and when a link between the LAN switch 123, the LAN switch 124, and a network interface of other equipment is released.

When a network interface is connected to a port of either the LAN switch 123 or LAN switch 124 and the link is established, a linkup trap is generated in the LAN switch 123 or LAN switch 124. Moreover, when a network interface connected to a port of either the LAN switch 123 or LAN switch 124 is disconnected or does not function, a linkdown trap is generated in the LAN switch 123 or LAN switch 124. A LAN switch with an IETF standard protocol SNMP (Simple Network Management Protocol) usually has the function of the linkup trap and linkdown trap.

Figure 17:
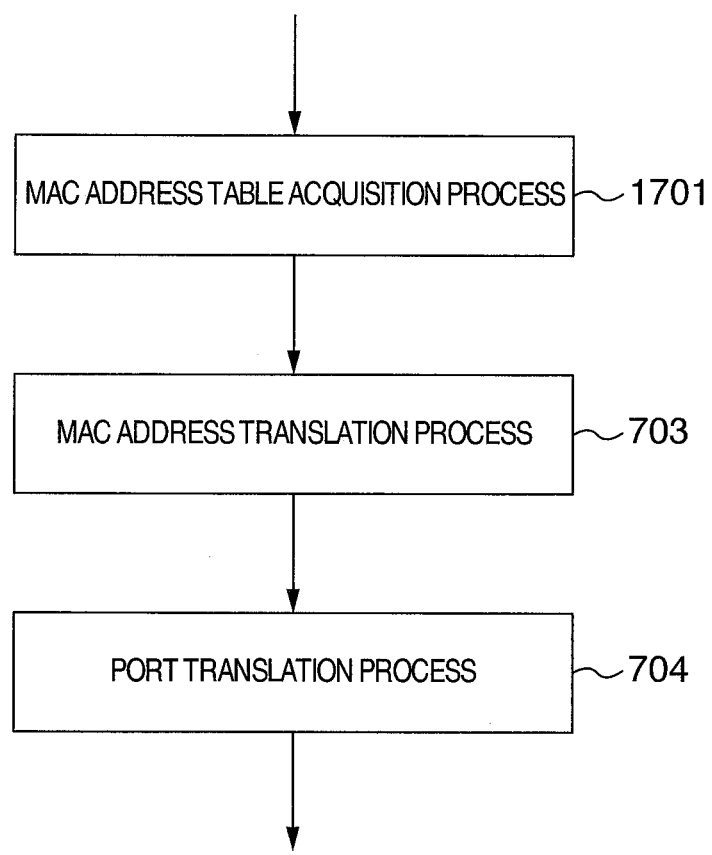
FIG. 17 is a view showing an SNMP trap receive process in a presence server in a third embodiment.

The process when the presence server 125 received the SNMP trap packet is described using FIG. 17. First, in a MAC address table acquisition process 1701, the contents of the MAC address table are obtained from a LAN switch that transmitted the SNMP trap packet, and only information on a port that is associated with a place is stored in a storage device. For example, if the LAN switch 123 transmitted the trap, the MAC address table 401 is obtained from the LAN switch 123, and only information related to the port 1 115, port 2 117, and port 3 116, which are associated with the places in the port-place correspondence table 201, is stored. In other words, because the row 404 and row 405 are not related to the above ports, only the row 402 and row 403 are stored. Moreover, if the LAN switch 124 transmitted the trap, the MAC address table 501 is obtained from the LAN switch 124, and only information related to the port 1 119 and port 2 120, which are associated with the places in the port-place correspondence table 201, is stored. In other words, because the row 503, row 504, and row 505 are not related to the above ports, only the row 502 is stored.

Next, in the table merging process, all of the contents of the port-MAC address correspondence table stored in the storage device are summarized in one port-MAC address correspondence table 601. At this time, with respect to the LAN switches other than the LAN switch that transmitted the trap, the contents of the port-MAC address correspondence table that was obtained when the previous trap occurred, and has been stored in the storage device, are used.

Subsequently, the presence table 801 will be generated by carrying out the MAC address translation process 703 and the port translation process 704.

Although in the third embodiment, only a fact that a MAC address table was modified is informed from a LAN switch to the presence server 125 and then the contents of the MAC address table is obtained from the LAN switch once again by the presence server 125, it is also possible for a LAN switch to promptly push all the contents of the MAC address table or only a modified portion to the presence server 125 upon detection of a linkup or a linkdown. In the third embodiment the presence server 125 does not need to poll a plenty of LAN switches, thus providing an advantage that the load on the presence server 125 can be reduced further as compared with the first embodiment.

[Example 4]

Next, a fourth embodiment is described. In this embodiment, a correspondence between equipment and a user is dynamically grasped using a user authentication information. Namely, in the first embodiment, a correspondence table between the identifier of a network interface of each equipment and a user identifier is registered in the presence server 125 in advance, assuming that a specific user uses each equipment. With this method, a case where a plurality of users share and use each equipment can not be handled, and even in the case where a fixed user uses each equipment, if the user is changed, incorrect information will be obtained and displayed until the contents registered to the presence server 125 are changed.

In order to avoid the above-described problem, in the fourth embodiment the correspondence between the identifier of a network interface of each equipment and the user identifier is not fixed but this correspondence is caused to be registered at the time of user authentication. In order to register this correspondence at the time of user authentication, an authentication server may be prepared so as to send a user authentication information from a PC, which the user uses, to the authentication server. The methods for this include three kinds as shown in FIG. 10, i.e., FIG. 10A, FIG. 10B, and FIG. 10C.

Figure 10A:
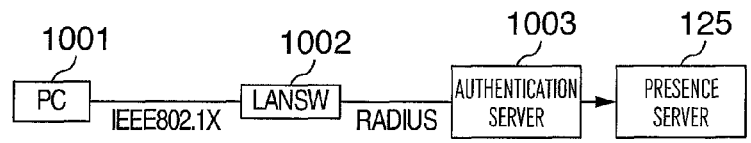
FIGS. 10A-10C are explanatory views of three methods for obtaining location information using an authentication mechanism in a fourth embodiment.
Figure 10B:
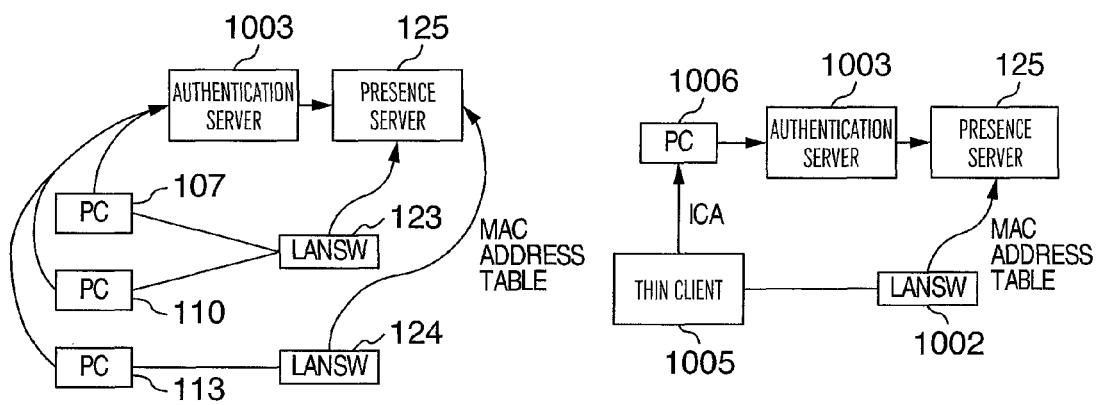
Figure 10C:
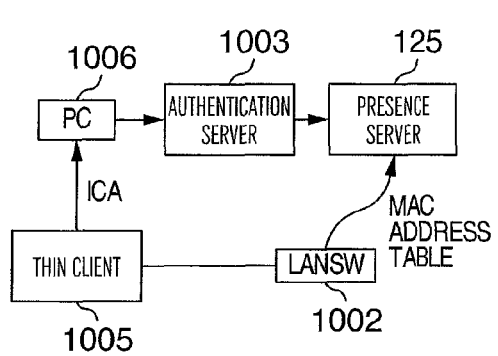

FIGS. 10A-10C show three methods for obtaining location information using an authentication mechanism (fourth embodiment).

FIG. 10A shows a method in which the presence server 125 obtains a user identification information using a network authentication mechanism. That is, PC 1001 receives the authentication information from a user, and then the LAN switch 1002 transmits to an authentication server 1003 a pair of the authentication information and the port number of the LAN switch 1002, to which the above PC is connected. The authentication server 1003 transmits to the presence server 125 a pair of the user identifier and the port number contained in the authentication information. IEEE standard protocol IEEE 802.1X can be used for sending the authentication information to the LAN switch 1002 from PC 1001. Moreover, if the operating system Microsoft Windows (registered trademark) XP is installed in PC 1001, PC 1001 has a mechanism in which the authentication information, i.e., a user identifier and a password, which a user inputted, is sent based on IEEE 802.1X. Moreover, if the LAN switch 1002 conforms to IEEE 802.1X, it has a mechanism in which the authentication information received from PC 1001 is sent to the authentication server 1003 by an IEFT standard protocol RADIUS. Because RADIUS has the function to send a port number together with the above-described information in a message, the presence server 125 can obtain the user identification information using this.

However, because the original function of the authentication server does not include the function to send to the presence server 125 a pair of information of the user identifier and the MAC address, a program for sending the above-described pair of information to the presence server 125 at regular time intervals needs to be implemented in the authentication server 1003, or it is necessary to implement in the authentication server 1003 a program for sending the above-described pair of information to the presence server 125 upon receipt of a request message from the presence server 125, and also implement in the presence server 125 a program for sending to the authentication server 1003 a message for requesting to send the above-described pair of information at regular time intervals.

In addition, in the method of FIG. 10A, unlike other methods, the presence server 125 does not need to receive the contents of the MAC address table from the LAN switch 1002. Accordingly, if each LAN switch has a network authentication function, this method can be applied to the case where each LAN switch has neither the function to output the contents of the MAC address table to the outside nor the function of VLAN switching, thus providing an advantage that the investment cost to the LAN switch can be reduced. However, in the case where the LAN switch 1002 does not have the function to send the MAC address of PC 1001 through the RADIUS protocol, but sends an IP address through the RADIUS protocol, it is possible to make correspondence between a user identifier and its location by making correspondence between the MAC address and the IP address by a method using a DHCP server described below in the description of FIG. 10B.

FIG. 10B shows a method for directly transmitting authentication information from PC to the authentication server 1003. In other words, PC 107, PC 110, or PC 113 receives authentication information from a user, and PC 107, PC 110, or PC 113 transmits to the authentication server 1003 a pair of the authentication information and the MAC address of PC 107, PC 110, or PC 113. The presence server 125 receives the correspondence table 301 between the MAC addresses and user identifiers from the authentication server 1003 (however, although in the first embodiment the correspondence table 301 between the MAC addresses and user identifiers is static and will not change, in this embodiment it will change every time a new user carries out user authentication.) However, although the information on all the users who carried out the authentication and who are currently connected is included in Table 301, the rows that did not change among the rows of Table 301 do not necessarily need to be transmitted to the presence server 125.

On the other hand, the presence server 125 obtains the correspondence table 601 between the MAC addresses of network interfaces of PC 107, PC 110, and PC 113 and the port numbers in the LAN switch 123 and LAN switch 124 by receiving the contents 401 and 501 of the MAC address table from the LAN switch 123 and LAN switch 124. Accordingly, the presence table 801 can be obtained by associating the users who logged in to PC 107, PC 110, and PC 113, with the locations of PC 107, PC 110, and PC 113. Because in the first embodiment Table 301 is static, the contents of the presence table 801 will not change unless the port of a LAN switch and equipment are detached, but in this embodiment every time a new user is authenticated, the contents of Table 301 will change and the contents of the presence table 801 will also change accordingly.

In addition, in FIG. 10B, PC 107, PC 110, and PC 113 may be thin clients. In other words, even when a computer for executing the operation inputted at PC 107, PC 110, or PC 113 exists outside of PC 107, PC 110, and PC 113, as far as the authentication information is concerned if PC 107, PC 110, or PC 113 directly transmits this information to the authentication server 1003, the method of FIG. 10B is applied.

Moreover, in the case where the IP addresses of PC 107, PC 110, and PC 113 are distributed from a DHCP server, an IP address instead of a MAC address also can be used as the address transmitted to the authentication server 1003 from PC 107, PC 110, or PC 113. In this case, an IP address instead of a MAC address is also transmitted from the authentication server 1003 to the presence server 125. In this case, the presence server 125 needs to know a correspondence between the MAC addresses and IP addresses of PC 107, PC 110, and PC 113, but in order to do this, if an arp command is executed in the presence server 125 or in other equipment on the network, the correspondence between the MAC addresses and the IP addresses can be obtained. Alternatively, the presence server 125 may be caused to receive from the DHCP server a pair of information of the above-described IP addresses and the corresponding MAC addresses concerning all the IP addresses which the DHCP server issued. Because this is not the intended function of the DHCP server, a program for realizing this communication needs to be implemented in the DHCP server. In other words, a new thread is generated so that the thread may transmit the contents of the table which the DHCP server originally has.

The method of FIG. 10B can be also applied to the case where the LAN switch does not have a network authentication function, thus providing an advantage that the investment cost to the LAN switch can be reduced. Moreover, the method of FIG. 10B can be applied to a network, which does not use a network authentication function of the LAN switch for operational reasons, thus providing an advantage that the operation of the network does not need to be changed.

FIG. 10C shows a method wherein a PC, which a user uses, is a thin client 1005, and authentication information is transmitted to the authentication server 1003 via an ordinary PC 1006. The thin client 1005 is used in place of PC 107 in FIG. 1, and PC 1006 is connected to the LAN switch 123 or LAN switch 124, or to a third LAN switch connected thereto. As the port-place correspondence table 201 of the presence server 125, the contents as shown in FIG. 2 are registered in advance. Unlike the first embodiment, the equipment, whose correspondence between the MAC address and the user identifier is dynamically determined, is not registered in the correspondence table 301 between the MAC addresses and user identifiers in advance. Accordingly, the initial correspondence table 301 between the MAC addresses and user identifiers includes only the row 303 and row 304 but does not include the row 302.

If a system of FIG. 10C is operated, the thin client 1005 receives authentication information from a user and transmits the authentication information and the MAC address of the thin client 1005 to PC 1006 that executes the operation in the thin client 1005. PC 1006 transmits a pair of the authentication information and the MAC address of the thin client 1005 to the authentication server 1003, and then the authentication server 1003 transmits a pair of information of the user identifier and the MAC address of the thin client 1005 to the presence server 125. Usually, when transmitting information from the thin client 1005 to PC 1006, an ICA (Independent Computing Architecture) protocol of Citrix Systems, Inc., or RDP (Remote Data Protocol) of Microsoft Corporation is used. Upon receipt of a pair of information of the user identifier and the MAC address of the thin client 1005, the presence server 125 writes the contents to the correspondence table 301 between the MAC addresses and user identifiers. If a user called Yamada logs in to the thin client 1005 and the presence server 125 receives the pair of information, the contents of the correspondence table 301 between the MAC addresses and user identifiers become as described in FIG. 3.

Because in the MAC address table 401 of the LAN switch 123, the MAC address of PC 1006 in place of the MAC address of PC 107 is registered, if the MAC address of PC 1006 is 99-20-ED-7A-3E-CF and PC 1006 is connected to a third LAN switch, the contents of the MAC address table 401 become as described in FIG. 4. Moreover, the contents of the MAC address table 501 of the LAN switch 124 also become as described in FIG. 5. Accordingly, the contents of the port-MAC address correspondence table 601 of the presence server 125 also become as described in FIG. 6. The location information acquisition procedure in this embodiment also follows FIG. 7. If the contents of the correspondence table 301 between the MAC addresses and user identifiers are as described in FIG. 3, the resulting contents of the presence table 801 will be as described in FIG. 8.

Also in this embodiment, in the same way as in FIG. 10B, every time a new user is authenticated, the contents of the correspondence table between the MAC addresses and user identifiers will change and the contents of the presence table will also change accordingly. Also in this embodiment, if the one transmitted from the thin client 1005 to PC 1006 is the IP address in place of the MAC address, then also from PC 1006 to the authentication server 1003 the IP address in place of the MAC address is transmitted, and also from the authentication server 1003 to the presence server 125 the IP address in place of the MAC address is transmitted. In order to make correspondence between the MAC address and the IP address, the information of the DHCP server is used in accordance with the above-described method.

Although in FIG. 3 only one MAC address is registered for each user, one user can also log in to a plurality of equipment as in the first embodiment. If one user uses a plurality of equipment at different places, it appears that one person exists at a plurality of places at the same time, this problem can be solved by identifying the latest authentication information among the authentication information from these plurality of equipment and regarding the equipment that sent this the most probable one as the candidate of the user location, and then by displaying this distinctly from other equipment which the same user uses. In order to identify the latest authentication information, the time when the information was obtained may be added to each row in the MAC address-user ID correspondence table 301 and the above-described time may be also copied to the presence table 801 so as to be used when displaying.

Because the method of FIG. 10C can be applied also to the case where the thin client 1005 does not have the function to directly transmit authentication information to the authentication server but has only an authentication method via an ordinary PC, it is not necessary to make changes for adapting the method of FIG. 10A or FIG. 10B to the method of FIG. 10C, thus providing an advantage that the development cost can be reduced.

[Embodiment 5]

Figure 11:
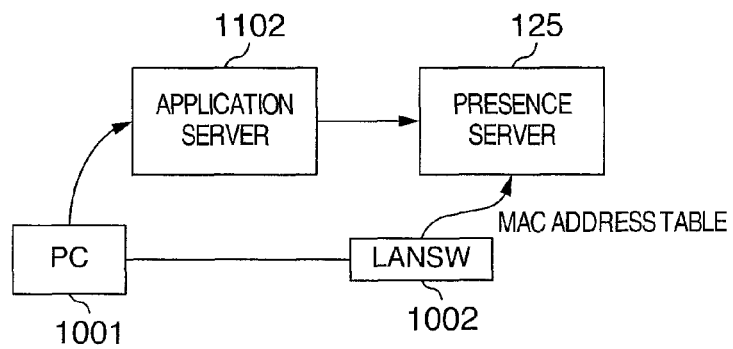
FIG. 11 is an explanatory view of a method for obtaining location information using application communication in a fifth embodiment.

Next, a fifth embodiment is described using FIG. 11. In this embodiment, the presence server 125 receives the corresponding information between the user identifiers and the addresses from PC 1101 via an application server 1102 without using the authentication server. In other words, once an application is activated in PC 1101, a message including the user identifier and the address is sent to the application server 1102. The application server 1102 transmits the message including the user identifier and the address to the presence server 125. Alternatively, a message including the user identifier and the address may be transmitted directly from PC 1101 to the presence server 125. Moreover, the presence server 125 obtains the contents of the MAC address table from the LAN switch 1002.

The examples of the application include an IP telephone, a video conference system, and Instant Messaging, and the examples of the protocol used for messaging from PC 1101 to the application server 1102 include SIP (Session Initiation Protocol) that is an IETF standard. In case of using SIP, SIP URI as the user identifier is used, and as the address an IP address contained in a contact address header is used. Because an IP address instead of a MAC address is used, a correspondence between the MAC address and the IP address needs to be obtained based on the information from the DHCP server in accordance with the above-described method. When SIP is used, as the application server 1102 a SIP proxy (SIP relay program) is used. In this case, a SIP message which the application server 1102 receives from PC 1101 is transferred to the presence server 125.

In the fifth embodiment a correspondence between the user identifier and the MAC address can be obtained and reflected on the location information without depending on an authentication system and thus even when not carrying out authentication, thus providing an advantage that the application range can be extended further than the method using an authentication system.

[Embodiment 6]

Next, a sixth embodiment is described. In this embodiment, a wireless LAN or other wireless communication means is used together with a wired LAN. In other words, a wireless LAN access point is connected to the port 5 and the port 6 of the LAN switch 123, respectively, to be installed in two separated places in the office 101. The parameters of the above-described two wireless LAN access points are made the same. The places of the two wireless LAN access points are registered also in the port-place correspondence table 201 in advance. When a wireless LAN equipment is used in the office 101, it is connected to the LAN via one of the above-described two wireless LAN access points. Here, because the information of the wireless LAN equipment is already added to the presence table of the presence server 125, i.e., to the table of FIG. 8, via which wireless LAN access point the connection is made is known referring to this table. Because which wireless LAN access point to be selected by the wireless LAN equipment is determined based on which wireless LAN access point exists at a closer distance from the wireless LAN equipment, an approximate location of the wireless LAN equipment can be known based on the presence table 801.

In a wireless LAN a location cannot be determined accurately because the service range of an access point is wide, but the use of a wireless communication means with a narrower service range would allow for more accurate location acquisition. In particular, the use of Bluetooth allows the location to be determined with an accuracy of several meters.

[Embodiment 7]

Next, a seventh embodiment on the basis of the third embodiment is described. In this embodiment, an IP telephone instead of a PC is used as equipment, and a telephone number determined by the port of a LAN switch is automatically assigned to the IP telephone. Assume that reference numerals 107, 110, and 113 in FIG. 1 denote IP telephones (or PCs including a softphone). Moreover, a port-place correspondence table 1801 shown in FIG. 18 is used in place of the port-place correspondence table 201 to thereby generate a presence table 1901 shown in FIG. 19 in place of the presence table 801. In the port-place correspondence table 1801, the telephone number for each port is described in addition to each column of the port-place correspondence table 201. Namely, the telephone number assigned to an IP telephone connected to each port is described.

When the IP telephone 107 is connected to the LAN switch 115, the LAN switch 115 transmits an SNMP linkup trap packet to the presence server 125 (LAN switch 115 is set in advance so as to transmit the SNMP linkup trap packet to the presence server 125). Although the presence server 125 carries out the processing in accordance with the procedure of FIG. 17, the port-place correspondence table 1801 is used in place of the port-place correspondence table 201 at the time of the port translation process 704, thereby determining the presence table 1901 and at the same time assigning the telephone number included in the port-place correspondence table 1801 to the relevant IP telephone. In other words, the setting is made by transmitting a telephone number setting message to the relevant IP telephone. If the LAN switch name is "Office" and the port number is 1, a row 1902 is generated with reference to a row 1802 and at the same time a telephone number setting message including a telephone number 4001 is transmitted to the IP telephone 107. In transmitting the message to the IP telephone 107 the IP address of the IP telephone 107 needs to be obtained, but if an arp command is executed in the presence server 125, a correspondence between the MAC address and the IP address can be obtained. Alternatively, if the IP address allocation to the IP telephone 107 is carried out by the DHCP server, a correspondence between the MAC address and the IP address can be obtained from the DHCP server using the method in FIG. 10(*b*).

In displaying the location information on a user's PC, the contents of the presence table 1901 can be also displayed as a table on a display, but it is also possible to display telephone numbers 4001, 4003, and 5001, respectively, in the vicinity of the display of "Yamada" 901, "Takai" 902, and "Kunisaki" 903 in FIG. 9. Moreover, provision is made such that by indicating a telephone number in a table that displays the contents of the presence table 1901 or a telephone number displayed in the vicinity of the user identifier in FIG. 9, this telephone number can be called for carrying out communication.

In addition, the seventh embodiment is not limited to the IP telephone but can be applied also to other types of communication means, such as Instant Messaging and a conference system. In other words, because in these communication means a terminal is identified by an address, such as SIP URI (Uniform Resource Identifier), in place of the telephone number, the telephone number in the IP telephone is replaced with the above-described address, thereby allowing the seventh embodiment to applied and allowing the correspondence between an address connected to a specific port and a user of a communication equipment connected to this port to be obtained.

The seventh embodiment has an advantage that the telephone number and the address can be automatically assigned to the equipment by associating with the port of a LAN switch and the assigned telephone number and address can be taken into the presence table 1901 for displaying.

Moreover, although the use of an ordinary PC is assumed in the seventh embodiment, an embodiment, wherein the telephone number is automatically assigned to a terminal (a thin client or PC) by using a thin client, can be also employed. In other words, as in FIG. 10(*c*), a user inputs/outputs a data including authentication information in the thin client 1005, but the processing is carried out in PC 1006. Although in this case the handling of the MAC address and the authentication information of the thin client is the same as that of the fourth embodiment, the telephone number is processed by one of the following methods.

A first method is the case where the telephone number is mapped to the port of the connected LAN switch 1002, to which the thin client 1005 is connected. In this case, as in the partially modified fifth embodiment, a correspondence between the places, user identifiers, and telephone numbers is determined at the time of the port translation process 704 using the telephone numbers described in the port-place correspondence table 1801 regarding the LAN switch 1002, thereby generating the presence table 1901. In generating the presence table 1901, the telephone number described in the port-place correspondence table 1801 is assigned to an audio terminal. In other words, a telephone number setting message is transmitted. Here, if the thin client 1005 directly carries out voice transmission/reception and signaling, the above-described audio terminal refers to the thin client 1005. Moreover, in the case where PC 1006 carries out voice transmission/reception and signaling, the audio terminal refers to PC 1006.

In contrast, a second method is the case where the telephone numbers are mapped to the users. In this case, a correspondence table between the user identifiers and telephone numbers is stored in the presence server 125 in advance. At the time of the MAC address translation process 703, a correspondence between the places, user identifiers, and telephone numbers is determined using the correspondence table 301 between the MAC addresses and user identifiers together with the above-described correspondence table between the user identifiers and telephone numbers, thereby generating the presence table 1901. In generating the presence table 1901, the telephone numbers described in the port-place correspondence table 1801 are assigned to the audio terminals.

In addition, in all the embodiments described above, as the network a LAN via IEEE 802.2 is used, and the location is determined by the port of a wired LAN equipment, the method of the present invention can be also applied to a wired network using a protocol other than IEEE 802.2. Namely, the method of the present invention can be applied by using a network connection device with a plurality of ports, in place of the LAN switches, the network connection device using other protocol, and by using the address of a protocol layer thereof in place of the MAC address.

According to the present invention, the location information of a plurality of equipment or users who use the equipment can be obtained at low cost in a wired LAN, and the present invention can be applied also to the equipment not having a special function. Moreover, a location can be determined accurately in a predetermined segmented area, and a correct location can be determined even when an IP address is changed.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A network system comprising: a network connection device having a plurality of ports; a network equipment connected to the network connection device via one of the plurality of ports; and a server connected to the network connection device,
   wherein the server includes a storage part for storing a first correspondence between a physical location of a connection destination of the port and an identifier of the port, and a second correspondence between a network address of the network equipment and an identifier of a user of the network equipment,
   wherein a plurality of the network equipments is registered for the one user;
   wherein the network connection device includes a storage part for storing a third correspondence between the identifier of the port, and the network address of the network equipment connected to the port,
   wherein the server receives the third correspondence from the network connection device and obtains a fourth correspondence between the physical location of the network equipment connected to the port and the identifier of a user of the network equipment, based on the first, second, and third correspondences,
   wherein the fourth correspondence includes a time information related to when the third correspondence including the network address of the network equipment is received, and
   the server identifies a last-used network equipment among said plurality of network equipments based on the time information of the fourth correspondence.

2. The network system according to claim 1, wherein the server is an equipment management server,
   wherein in a storage part of the server, a fifth correspondence between the identifier of the network equipment and management information of the network equipment is stored, and
   wherein the server further includes a display part which, based on the fourth and fifth correspondences, displays a map showing the location of the network equipment and the management information of the network equipment, in the vicinity of the location of the network equipment on the map.

3. The network system according to claim 1,
   wherein to the port of the network connection device, a logically independent virtual network identified by a virtual network identifier is assigned, and
   wherein in the first and third correspondences, the virtual network identifier is used in place of the identifier of the port.

4. A network system comprising: a network connection device having a plurality of ports; and a network equipment connected to the network connection device via one of the plurality of ports; a server connected to the network connection device; and an authentication server connected to the network connection device,
   wherein the server includes a storage part for storing a first correspondence between a physical location of a connection destination of the port, and an identifier of the port,
   wherein the network connection device receives authentication information transmitted from the network equipment to the authentication server, the authentication information including an identifier of a user of the network equipment and a network address of the network equipment, and transmits the authentication information to the authentication server, wherein a plurality of network equipments is registered for the one user, and
   further transmits to the server a second correspondence between an identifier of a user contained in the authentication information and the network address, and
   further transmits to the server a third correspondence between the network address and an identifier of a port that received the authentication information,
   wherein the server obtains a fourth correspondence between a physical location of the network equipment connected to the port and an identifier of the network equipment, based on the first, second, and third correspondences,
   wherein the fourth correspondence includes a time information related to when the third correspondence between the network address and an identifier of a port that received the authentication information is received, and
   wherein the server identifies a last-used network equipment among said plurality of network equipments based on the time information of the fourth correspondence.

5. The network system according to claim 4, wherein the network connection device is a LAN switch,
   wherein the network address is an IP address,
   wherein the server, when the IP address is distributed from a DHCP server to the network equipment, receives from the DHCP server a correspondence between the IP address which the DHCP server generates, and a MAC address of the network equipment, and
   obtains the fourth correspondence based on a correspondence between the IP address and the MAC address in addition to the first, second, and third correspondences.

* * * * *